United States Patent [19]

Lamerant

[11] Patent Number: 5,653,947

[45] Date of Patent: Aug. 5, 1997

[54] METHOD OF TREATING ALUMINA TRIHYDRATE CONTAINING BAUXITE OF LOW REACTIVE SILICA CONTENT TO FORM SUPERSATURATED SODIUM ALUMINATE LIQUOR

[75] Inventor: Jean Michel Lamerant, Bouc Bel Air, France

[73] Assignee: Aluminium Pechiney, Courbevoie, France

[21] Appl. No.: 623,860

[22] Filed: Mar. 29, 1996

[30] Foreign Application Priority Data

Mar. 31, 1995 [FR] France ................... 95 04069

[51] Int. Cl.$^6$ ........................... C01F 7/00
[52] U.S. Cl. ........................... 423/121; 423/600
[58] Field of Search ........................... 423/121, 600

[56] References Cited

U.S. PATENT DOCUMENTS

| | | |
|---|---|---|
| 3,413,087 | 11/1968 | Roberts. |
| 4,145,398 | 3/1979 | Plass ........................... 423/121 |
| 4,426,363 | 1/1984 | Yamada et al. ........................... 423/121 |
| 4,574,074 | 3/1986 | Cristol et al. ........................... 423/121 |
| 4,650,653 | 3/1987 | Lepetit et al. ........................... 423/121 |
| 4,994,244 | 2/1991 | Fulford et al. ........................... 423/121 |
| 5,163,973 | 11/1992 | Ellis ........................... 423/121 |

FOREIGN PATENT DOCUMENTS

| | | |
|---|---|---|
| 0 203 873 | 12/1986 | European Pat. Off.. |
| 0 564 659 | 12/1986 | European Pat. Off.. |
| 1506516 | 12/1967 | France. |
| WO 94/18122 | 8/1994 | WIPO. |

*Primary Examiner*—Steven Bos
*Attorney, Agent, or Firm*—Oblon, Spivak, McLelland, Maier & Neustadt, P.C.

[57] ABSTRACT

The present invention is a method for producing alumina trihydrate with a low silica content from Gibbsite-containing bauxite of low reactive silica content. The present method involves two desilication steps: one step before extraction of alumina from the bauxite, i.e., a pre-desilication, and an additional desilication step following alumina extraction, i.e., a post-desilication. The present method comprises the steps of:

(a) heating a suspension of ground bauxite in an aqueous solution comprising sodium hydroxide at a temperature greater than 80° C.; and (b) increasing the sodium hydroxide concentration of the suspension from (a); and (c) heating the suspension from (b) at a temperature greater than 80° C.; and (d) diluting the suspension from (c) with an aqueous solution; and (e) heating the suspension from (d) at a temperature greater than 80° C., affording a suspension comprising a supersaturated, desilicated sodium aluminate liquor and insoluble solid.

33 Claims, 1 Drawing Sheet

METHOD OF TREATING ALUMINA TRIHYDRATE CONTAINING BAUXITE OF LOW REACTIVE SILICA CONTENT TO FORM SUPERSATURATED SODIUM ALUMINATE LIQUOR

BACKGROUND OF THE INVENTION

1. Field of the Invention

The present invention is a method for producing alumina trihydrate with a low silica content from Gibbsite-containing bauxite of low reactive silica content. The present method comprises two desilication steps which are effective in removing silica impurities: one step before extraction of alumina from the bauxite, i.e., a pre-desilication, and an additional desilication step following alumina extraction, i.e., a post-desilication.

2. Description of the Background Art

The Bayer process, widely described in the specialized literature, is the most important method used in the production of alumina. Alumina produced by the Bayer process can be used in the hydrate state, as transition alumina, calcined alumina, sintered or melted alumina, and can also be transformed into aluminum by igneous electrolysis.

In the Bayer process, bauxite is digested at an elevated temperature with an aqueous solution of sodium hydroxide with a concentration sufficient to solubilize the alumina to produce a supersaturated solution of sodium aluminate. After separation of the solid phase comprising undigested ore (red mud), the supersaturated solution of sodium aluminate is seeded with particles of alumina trihydrate in order to induce precipitation of alumina as alumina trihydrate.

The sodium aluminate liquor remaining after removing the precipitated alumina trihydrate, now poor in alumina, is known as decomposed liquor, spent liquor or depleted liquor. This decomposed liquor is then concentrated and recharged with sodium hydroxide to provide a digestion liquor which can be recycled in the digestion step.

It is well known to those of ordinary skill in the art that the conditions of the alkaline treatment of the bauxites in the Bayer process must be modified according to the degree of hydration and the crystallographic structure of the alumina as well as the nature and the content of the impurities found in the bauxite such as silica, iron oxides, humic materials, etc. Accordingly, bauxites containing alumina in the monohydrate stage (bohemite, diaspore) are treated at a temperature higher than 200° C., generally between 220° C. and 300° C. Bauxites containing alumina in the trihydrate stage (hydrargillite, also called gibbsite) are digested at temperatures lower than 200° C., and even at atmospheric pressure, which is easier to implement and results in important savings in operating costs by eliminating the need for autoclaves and pressure reactors.

Generally, the extraction yields of soluble alumina are higher than 95% and the purity of the resulting supersaturated sodium aluminate liquor, which influences the purity of the subsequently precipitated alumina trihydrate, is satisfactory if one is careful to limit the contents of these impurities by selective purification steps. The difficulty of these purifications, particularly int he case of silica, depends on the mineralogical forms of the impurities present.

Silica can be present in bauxite in several mineralogical forms that are not equally soluble in the sodium hydroxide solution. Some mineralogical forms of which Kaolin ($Al_2O_3.2SiO_2.2H_2O$) is the most common are solubilized along with the alumina trihydrate.

The term "reactive silica" is commonly applied to that fraction of the silica present in the bauxite in one of these forms, counted as $SiO_2$, and usually accounts from 0.5 to 7% of the dry bauxite weight. In the presence of sodium hydroxide liquor, the reactive silica is first solubilized and then re-precipitated as sodium silico-aluminate.

The concentration of soluble silica in the sodium hydroxide liquor is determined by the solubility equilibrium of the sodium silico-aluminate after a very long time. During the industrial treatment of a bauxite containing alumina trihydrate, it is rare that the solubility equilibrium of the sodium silico-aluminate be reached. Usually, the silica concentration in the sodium liquor is greater, and even much greater, than the solubility equilibrium of the sodium silico-aluminate. This concentration is linked, consequently, to the solubility equilibrium of the sodium silico-aluminate and at the same time to its kinetic precipitation. This kinetic precipitation is slowed when the bauxite contains low amounts of reactive silica, because the precipitation of the sodium silico-aluminate is favored by the presence of reaction product.

In the Bayer cycle, the concentration of soluble silica in the alumina-enriched liquor after digestion of the bauxite is an important parameter because it determines that of the recycled digestion liquor as well as the level of silica impurity in the alumina product. It is therefore desirable to combine with the alumina extraction, a process known as "desilication" of the sodium aluminate liquor in order to reduce the silica concentration in this liquor, and therefore the level of the silica impurity in the alumina product. In order to allow the formation of insoluble sodium silico-aluminates, whose kinetic precipitation is relatively slow, desilication times of several hours are necessary, usually not exceeding ten hours, however.

This desilication process can be done during the digestion of the bauxite but preferentially during a distinct operation either preceding or following the digestion. See U.S. Pat. No. 4,426,363, FR 1506516 and U.S. Pat. No. 3,413,087, all incorporated herein by reference.

These desilication processes all place crushed bauxite in contact with all or part of the decomposed Bayer liquor, with a $Na_2O$ concentration between 190 and 200 g/liter and at temperatures between 80° C. and 200° C., according to the nature of the bauxite to be treated. They usually afford satisfactory desilication performances with bauxite comprising less than 3% reactive silica based on the weight of dry bauxite.

On the other hand, using prior art processes for the desilication of alumina trihydrate containing bauxite in which the reactive silica content is less than 3% and often between 0.5 to 1.5%, requires a desilication time of at least 30 hours, or three times the usual desilication time, either before or after digestion of the bauxite. This long desilication period is necessary to reduce the concentration of soluble silica in the supersaturated sodium aluminate solution so that the ratio of soluble $SiO_2/Na_2O$ is less than 0.90%, preferably less than 0.70%.

Under such conditions, the advantages expected from the digestion process occurring at atmospheric pressure are eliminated by the notable reduction of treatment capacity which can only be compensated by scaling up the process.

We note that the methods of EP 0203873 and U.S. Pat. No. 4,650,653, both incorporated herein by reference, of increasing the rate of the kinetic precipitation of sodium silico-aluminate by lowering the sodium hydroxide concentration to less than 120 g/liter in of the solution decomposed liquor used in the pre-desilication step, cannot be applied effectively in the present case because they are contrary to the desired goals herein including:

Preserving the existing production capacity and avoiding any significant increase of the time spent in the reactor and also any volume increase by dilution of the products circulating in the production line.

Obtaining a productivity of at least 70 kg $Al_2O_3$ per $m^3$ of supersaturated sodium aluminate liquor.

This productivity, P, is the product of the concentration, C, of sodium hydroxide in said liquor and the variation, $\Delta Rp$, of the concentration ratio, Rp, defined as soluble $Al_2O_3$ (g/l)/$Na_2O$(g/l), between the beginning and the end of the decomposition. It is advantageous to keep the sodium hydroxide concentration in the digestion as high as possible, since this concentration also determines the maximum value of Rp before decomposition and therefore the magnitude of $\Delta Rp$. In fact, during the dilution and the decantation of the suspension obtained following digestion of the bauxite, the risks of precipitation by spontaneous nucleation of part of the alumina trihydrate, known as retrogradation, are greatest when the sodium hydroxide concentration is low. In the present case, the maximum Rp before decomposition cannot be greater than 1.05 which practically limits the productivity to 70 kg $Al_2O_3/m^3$ for a final Rp preferably between 0.5 and 0.7.

Obtaining an extraction yield of the potential soluble alumina of at least 95%, which is similar to the yields usually obtained with the other types of bauxite. This implies not only a very complete digestion of the ore but also the prevention of any retrogradation that could lead to a significant decrease in yield of alumina, which can be 5 to 10% even 20% of the final product.

Limiting the soluble silica content in the supersaturated liquor before decantation and decomposition, measured by the weight ratio of soluble $SiO_2/Na_2O$, to less than 0.90%, and preferably less than 0.70%, to guarantee a silica content in the precipitation alumina trihydrate less than 100 ppm.

SUMMARY OF THE INVENTION

Figure 1:
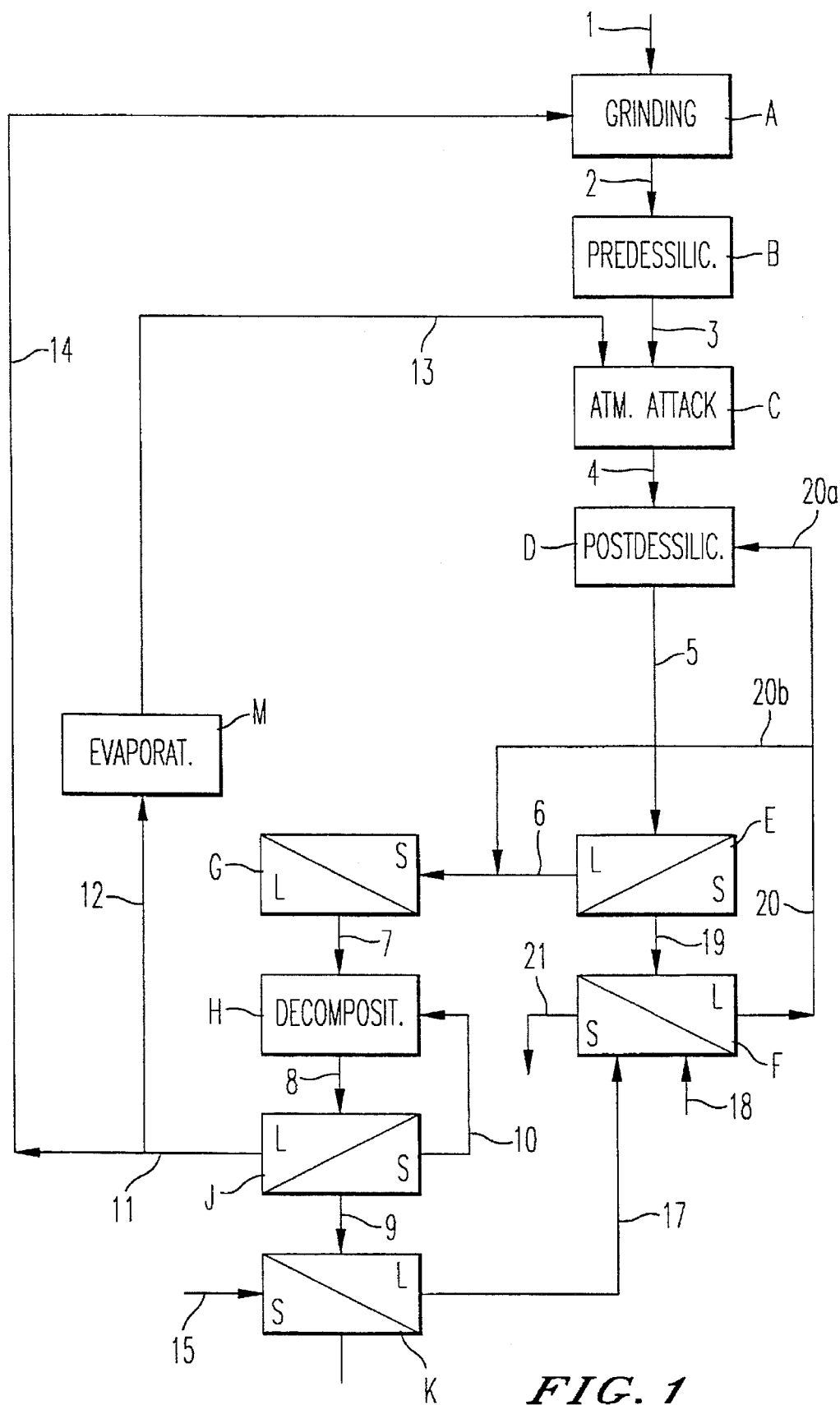
FIG. 1 is a schematic diagram of the present invention.

The present method for treating alumina trihydrate containing bauxite with a low reactive silica content achieves all of the above-stated goals. The present method is based on the surprising observation that by combining a desilication step prior to digestion of the bauxite, i.e., a pre-desilication, with a desilication step after bauxite digestion, i.e., a post-desilication, one can obtain an alumina trihydrate extraction yield of greater than or equal to 95%, a sodium aluminate liquor productivity greater than or equal to 70 kg $Al_2O_3/m^3$, and a weight ratio of soluble $SiO_2/Na_2O$ in the liquor less than 0.9%. Thus, alumina trihydrate can be produced in high yield with a silica content below 100 ppm. In the present process, the total desilication time is generally 10 hours, which is the same amount of time used in the desilication of other bauxites.

The present invention provides a method of preparing a supersaturated sodium aluminate liquor, comprising the steps of:

(a) heating a suspension of ground bauxite in an aqueous solution comprising sodium hydroxide at a temperature greater than 80° C.;

(b) increasing the sodium hydroxide concentration of the suspension from step (a);

(c) heating the suspension from step (b) at a temperature greater than 80° C.;

(d) diluting the suspension from step (c) with an aqueous solution; and (e) heating the suspension from step (d) at a temperature greater than 80° C., affording a suspension comprising a supersaturated, desilicated sodium aluminate liquor and insoluble solid.

The desired alumina trihydrate is then produced by the above method comprising the additional steps:

(f) removing insoluble solid from the supersaturated, desilicated sodium aluminate suspension to afford a supersaturated, desilicated sodium aluminate liquor;

(g) cooling and decomposing the supersaturated sodium aluminate liquor from step (f), affording a suspension of precipitated alumina trihydrate in decomposed sodium aluminate liquor;

(h) isolating the precipitated alumina trihydrate from step (g);

(i) recycling a fraction of the decomposed sodium aluminate liquor from step (g) to step (a);

(j) recharging the remaining fraction of the decomposed sodium aluminate liquor from step (g) by evaporation and addition of sodium hydroxide to afford a digestion liquor; and (k) recycling the digestion liquor from step (j) to step (b).

Specifically, the present method involves pre-desilication of ground bauxite suspended in a solution, preferably a decomposed sodium aluminate liquor, wherein Rp is 0.5 to 0.7 and the sodium hydroxide concentration is 140 to 170 g $Na_2O$/liter, by heating at a temperature less than or equal to 108° C., preferably for at least 30 minutes, preferably at atmospheric pressure, while keeping the concentration of dry material in the suspension greater than 0.7 ton/$m^3$. The pre-desilication step should be conducted at a temperature greater than 80° C.

Following pre-desilication the bauxite is digested with a digestion liquor, which has a higher concentration of sodium hydroxide than the pre-desilicated suspension. In other words, the sodium hydroxide concentration of the pre-desilicated bauxite suspension must be increased. The digestion liquor is preferably a decomposed sodium aluminate liquor, wherein Rp is 0.5 to 0.7 and the sodium hydroxide concentration is 180 to 220 g $Na_2O$/liter. The digestion is preferably conducted for a period of time sufficient to extract at least 95% of the alumina trihydrate from the bauxite sample at an elevated temperature, preferably at atmospheric pressure. The digestion step should be conducted at a temperature greater than 80° C. Following digestion the suspension is diluted in order to adjust Rp preferably to 1.05 to 1.17 and the sodium hydroxide concentration to 140 to 180 g $Na_2O$/liter. This diluted suspension is then subjected to a post-desilication step by heating at a temperature less than or equal to 108° C., usually between 95° to 105° C., preferably for at least two hours, preferably at atmospheric pressure. The post-desilication step should be conducted at a temperature greater than 80° C.

In many desilication experiments using alumina trihydrate containing bauxite with a low reactive silica content, notably of African or Indian origin, we have obtained unsatisfactory results using only one isolated desilication step either before or after digestion of the bauxite.

On the other hand, combining the effects of the pre-desilication and the post-desilication steps of the present invention allows one to treat without any capacity limitation, by digestion at atmospheric pressure, alumina trihydrate containing bauxite and a low reactive silica content, with performances in terms of yields of digestion and silica purification rates equivalent to the one obtained with the other bauxite containing alumina trihydrate, and also to considerably increase the productivity of the liquors to be decomposed since it is possible to reach Rp values of 1.12 to 1.15 without any risks of retrogradation. The present invention also affords a liquor productivity of at least 80 kg of $Al_2O_3$ per $m^3$ of liquor, therefore much higher than the one of the prior art which does not usually exceed 70 kg of $Al_2O_3$ per $m^3$.

DESCRIPTION OF THE PREFERRED EMBODIMENTS

The present invention will be better understood from the following detailed description of its preferential implementation with reference to FIG. 1, a schematic representation of the present invention.

The bauxite containing alumina trihydrate 1 in which the reactive silica content is less than 3% and usually comprised between 0.5 and 1.5%, is placed in contact with an aliquot 14 of decomposed sodium aluminate liquor 11, wherein the ratio Rp is preferentially between 0.57 and 0.67 and sodium hydroxide concentration is 150 to 160 g $Na_2O$/liter, and a weight content of soluble $SiO_2/Na_2O$ not exceeding 0.7%, in order to obtain, after wet grinding A, a thick suspension 2 which undergoes a pre-desilication B by heating, preferentially between 100° and 105° C., for 1 to 6 hours and which concentration in dry material stays preferentially between 0.9 and 1.1 ton per $m^3$ of suspension at the end of the pre-desilication. It is important to work with a sufficient concentration in dry material of the suspension because below 0.7 ton per $m^3$, one observes a significant decrease in the rate of sodium silico-aluminate precipitation.

The thick, pre-desilicated suspension 3 is then digested C, at atmospheric pressure and at a temperature not exceeding 108° C., preferentially between 103° and 107° C., for 1 to 3 hours, after increasing the concentration of sodium hydroxide in the suspension. This is preferentially accomplished with the remaining part 12 of the decomposed liquor 13 previously concentrated by evaporation N, called digestion liquor, wherein Rp is preferentially between 0.57 and 0.67, and the sodium hydroxide concentration is adjusted to 195 to 215 g $Na_2O$/liter.

At the end of the digestion C, preferably conducted at atmospheric pressure, one obtains a new suspension 4, wherein Rp is preferably between 1.09 and 1.15 and the sodium hydroxide concentration is preferably between 175 and 190 g $Na_2O$/liter. This is adjusted by dilution so that the sodium hydroxide concentration is between 140 and 180 g $Na_2O$/liter but preferably between 160 and 170 g $Na_2O$/liter, with, for example, a fraction 20a of the back water washes of the insoluble mud or the water washes of the alumina trihydrate production.

It is essential, to adjust carefully the sodium hydroxide concentration of the suspension before the post-desilication D. In fact, a sodium hydroxide concentration higher than 180 g $Na_2O$/liter increases the solubility limit of the reactive silica without improving the kinetic precipitation of the soluble silica in the solution into sodium silico-aluminate, making it impossible to lower the ratio soluble silica/$Na_2O$ of the suspension 4 to less than 0.90% without a significant increase in the pre-desilication time (more than 15 hours). Conversely, too high of a dilution of the liquor ($\leq$140 g $Na_2O$/liter) favors the precipitation of the silica as insoluble sodium silico-aluminate, but considerably increases the risks of retrogradation by when the desired Rp is >1.05. For this reason it is recommended that a sodium hydroxide concentration of 140–155 g $Na_2O$/liter be used in the present invention. It is recommended to aim for Rp values between 1.05 and 1.10 to avoid important yield drops due to retrogradation, which can decrease the liquor productivity to values less than 70 kg $Al_2O_3/m^3$.

The post-desilication D of the diluted suspension 4 is then conducted for preferably 4 to 8 hours at a temperature between 100° and 105° C. in order to lower the soluble $SiO_2/Na_2O$ weight content to less than 0.9% and usually less than 0.7%, without any significant changes in the sodium hydroxide concentration or the Rp value.

The resulting suspension 5 is then decanted E in order to separate, using a well-known method, the red muds 19 placed in discharged 21 after back-washes successively with the water wash 17 of the production alumina trihydrate 16 and pure water 18.

The liquor 6 resulting from the decantation E, in which Rp is preferably between 1.08 and 1.15, is again diluted by a fraction 20b of the dilution liquor coming from the back-wash washes of the red muds before undergoing a security filtration G in order to eliminate the fine particles of red muds remains the in suspension. The clear filtrate 7 of supersaturated liquor of sodium aluminate, wherein the sodium hydroxide concentration does not exceed 160 g $Na_2O$/liter, is cooled and decomposed H in the presence of seed particles of alumina trihydrate 10 recycled according to the prior art. The alumina trihydrate in suspension 8 in the decomposed liquor is separated by filtration J to be for the main part (90% of the weight approximately) recycled as seed 10 and for the minor part 9 (10% approximately) extracted for the production 16 after water 15 washes K. The remainder 12 of the filtrate 11 of decomposed sodium aluminate liquor, wherein Rp is between 0.55 and 0.67 and the sodium hydroxide concentration is between 150 and 160 g $Na_2O$/liter, after taking an aliquot 14 suitable for use in wet grinding and desilicating additional bauxite, is concentrated by evaporation M to give the digestion liquor 13 suitable for digesting ground bauxite, as previously described.

One will note that the ratio of soluble $SiO_2/Na_2O$ is usually adjusted to between 0.60 and 0.70% in the liquor 5 after dilution D, allowing for less than 100 ppm of silica in the $Al_2O_3$ product. This is achieved without modifying the desilication capacities of the present method compared to prior art processes as the total time spent in the reactor is approximately ten hours. This also without decreasing the extraction yields of the soluble alumina which are greater than 95%.

The 7 Examples described hereinafter have been carried out with a homogeneous lot of 60 tons of bauxite of Guinean origin containing alumina trihydrate with a low reactive silica content having the following (dry) composition:

| | | | |
|---|---|---|---|
| $Al_2O_3$ total: | 49.3% | $Fe_2O_3$: | 19.2% |
| $Al_2O_3$ extract: | 45.5% | $TiO_3$: | 2.98% |
| $SiO_2$ total: | 2.44% | Loss in fire: | 25.88 |
| $SiO_2$ reactive: | 0.83% | | |

Examples 1 and 2 use standard conditions of pre-desilication and of post-desilication, respectively, of bauxites containing alumina trihydrate, as described in the prior art for treating bauxites containing alumina trihydrate with a low reactive silica content, at atmospheric pressure.

Examples 3 to 7 use of the present invention for treating the same bauxite sample.

EXAMPLE I

Pre-desilication according to the prior art and atmospheric digestion of a 5-ton fraction from the 60-ton lot of Guinean bauxite previously characterized comprising:

Wet grinding and desilication with an aliquot of decomposed liquor and 1000 kg of dry material per $m^3$ of thick suspension for 10 hours at 100° C.

| decomposed liquor characteristics: | | |
|---|---|---|
| Rp = 0.58 | $Na_2O$: 152 g/l | soluble $SiO_2/Na_2O$: 0.69% |

Digestion at 107° C. for 1 hour and 30 minutes in an atmospheric reactor by the remaining part of the concentrated decomposed liquor or digestion liquor of concentration 201 g $Na_2O$/liter aiming for an Rp value of 1.05.

Characteristics of the supersaturated liquor after digestion, dilution and decantation of the suspension resulting from the digestion:

| Rp: | 1.05 |
|---|---|
| $Na_2O$: | 149 g/l |
| $SiO_2/Na_2O$: | 1.19% |

Although the digestion yield is greater than 95% and the productivity is on the order of 70 kg $Al_2O_3/m^3$ for a final Rp of 0.58, the content of soluble silica is redhibitory for the precipitated alumina trihydrate product as well as for the decomposed liquor recycled as digestion liquor.

In order to satisfy that criteria of the present invention another 5-ton fraction of the bauxite lot underwent a prolonged pre-desilication treatment for a total duration time of 30 hours while keeping all the other conditions identical.

The characteristics of the supersaturated liquor after dilution and decantation are the following:

| Rp: | 1.04 |
|---|---|
| $Na_2O$: | 150 g/l |
| $SiO_2/Na_2O$: | 0.76% |
| % Yield: | 97.9% |

These characteristics are acceptable but require a threefold increase in time necessary for desilication.

EXAMPLE II

Post-desilication according to the prior art after atmospheric digestion of another 5-ton fraction of the same Guinean bauxite lot comprising:

Wet grinding with an aliquot of decomposed liquor having the same characteristics as in Example I.

Digestion at 107° C. for 2 hours in an atmospheric reactor by the remaining part of the concentrated decomposed liquor, aiming for an Rp value of 1.06.

After dilution of the suspension resulting from the digestion to 145 g $Na_2O$/liter, a post-desilication of 8 hours at 100° C.

Characteristics of the supersaturated liquor after decantation of the suspension resulting from the post-desilication:

| Rp: | 1.06 |
|---|---|
| $Na_2O$: | 143 g/l |
| $SiO_2/Na_2O$: | 1.12% |
| % yield: | 98.2% |

As in Example I, the content of soluble silica stays redhibitory.

In order to satisfy the criteria of the present invention it was necessary to implement, on another 5-ton fraction of the same bauxite lot, a post-desilication treatment of a duration time of 32 hours while keeping all the other conditions identical, thus reducing the $SiO_2/Na_2O$ ratio to 0.71% which is entirely satisfactory but at the expense of a four-fold increase in the desilication time.

EXAMPLE III

This is the first example of the process according to the present invention which comprises combining a very short 1-hour pre-desilication to either a post-desilication of a duration time of 7 hours with dilution following the usual conditions in the range of 145 g $Na_2O$/liter or to a post-desilication of a duration time of 7 hours also but with a weak dilution designed to maintain a higher sodium hydroxide concentration during the post-desilication, on the order of 165 g $Na_2O$/liter. These treatments were performed with a 10-ton fraction of the Guinean bauxite lot previously characterized and comprise:

Wet grinding and pre-desilication with an aliquot of decomposed liquor and 1000 kg of dry material per $m^3$ of thick suspension for 1 hour at 100° C.

| Decomposed liquor characteristics: | | |
|---|---|---|
| Rp = 0.58 | $Na_2O$: 152 g/l | soluble $SiO_2/Na_2O$: 0.72% |

Digestion at 107° C. for 1 hour 30 minutes in an atmospheric reactor by the remaining part of the concentrated decomposed liquor or digestion liquor of concentration 203 g $Na_2O$/liter aiming for an Rp value of 1.11.

A) On one half of the suspension resulting from the digestion, adjustment of the concentration by water dilution to 145 g $Na_2O$/liter and post-desilication of 7 hours at 100° C.

Characteristics of the supersaturated liquor after decantation of the suspension resulting from the post-desilication:

| Rp: | 1.10 |
|---|---|
| $Na_2O$: | 147 g/l |
| $SiO_2/Na_2O$: | 0.79 |
| % Yield: | 96.3% |

B) On the other half of the suspension resulting from the digestion, adjustment of the concentration by weak water dilution to 165 g $Na_2O$/liter and post-desilication of 7 hours at 100° C.

Characteristics of the supersaturated liquor after decantation of the suspension resulting from the post-desilication:

| Rp: | 1.11 |
|---|---|
| $Na_2O$: | 168 g/l |
| $SiO_2/Na_2O$: | 0.86 |
| % Yield: | 98.8% |

One notes that for either A or B, the combination of a short pre-desilication with a normal post-desilication for a total duration time of 1+7=8 hours is surprisingly much more efficient than isolated treatments of pre-desilication or post-desilication for an equivalent length of time, as described in the prior art.

In addition to effectively removing silica impurities and affording high alumina extraction yields, the productivity of the present method is clearly superior in the variable B of Example 2 specially when after dilution of the liquor to 150 g $Na_2O$/liter and aiming to a final Rp value of 0.57 one obtains:

150 (1.11−0.57)=81 kg $Al_2O_3/m^3$

The variable A, noticeably more impressive than variable B in terms of desilication because of the dilution effect, is limited in terms of the Rp value due to a slight degradation of the alumina during the post-desilication which is expressed by an appreciable decrease in the extraction yield of 2.5%, compared to variable B.

EXAMPLE IV

This Example consists of combining a short 3-hour pre-desilication, with either a 7-hour post-desilication with previous dilution using the usual conditions to approximately 145 g $Na_2O$/liter, or to a 7-hour post-desilication with a weak dilution, that is a previous dilution to approximately 165 g $Na_2O$/liter. These treatments were conducted on a 10-ton fraction of the Guinean bauxite lot previously characterized, and comprise:

Wet grinding and pre-desilication with an aliquot of decomposed liquor and 1000 kg of dry material per m³ of thick suspension for 3 hours at 100° C.

The decomposed liquor characteristics are identical to the one of Example III.

Digestion at 107° C. for 1 hour and 30 minutes in an atmospheric reactor by the remaining part of the concentrated decomposed liquor or digestion liquor identical to the one of Example III aiming for an Rp value of 1.15.

A) On one half of the suspension resulting from the digestion, adjustment of the concentration by water dilution to 145 g $Na_2O$/liter and post-desilication of 7 hours at 100° C.

Characteristics of the supersaturated liquor after decantation of the suspension resulting from the post-desilication:

| Rp: | 1.13 |
|---|---|
| $Na_2O$: | 146 g/l |
| $SiO_2/Na_2O$: | 0.68 |
| % Yield: | 93.1% |

B) To the other half of the suspension from the digestion, adjustment of the concentration by water dilution to 165 g $Na_2O$/liter and post-desilication of 7 hours at 100° C.

Characteristics of the supersaturated liquor after decantation of the suspension resulting from the post-desilication:

| Rp: | 1.15 |
|---|---|
| $Na_2O$: | 168 g/l |
| $SiO_2/Na_2O$: | 0.72 |
| % Yield: | 98.6% |

After adjustment of the liquor concentration to approximately 150 g $Na_2O$/liter and aiming for an Rp value at the end of the decomposition of 0.57, one registers a very high productivity of the liquor (87 kg $Al_2O_3/m^3$) according to variable IV B, as well as a significant decrease in the silica content. It is noted that only variable IV B allows alumina retrogradation to be avoided whereas variable IV A leads to a significant decrease in extraction yield of the soluble alumina. One also notes that the total desilication time of 10 hours (3 hours+7 hours) is similar to the one used for the treatment of classical bauxite containing alumina trihydrate.

EXAMPLE V

This Example consists of combining an average 6-hour pre-desilication, to a standard 7-hour pre-desilication following dilution to approximately 165 g $Na_2O$/liter.

The desired Rp being 1.15, only the tests with weak dilution of the suspension resulting from the digestion were done considering the retrogradation observed in Example IV A for such an Rp value.

This treatment done on a 5-ton fraction of the Guinean bauxite lot previously characterized, and comprises:

Wet grinding and pre-desilication with an aliquot of decomposed liquor and 900 kg of dry material per m³ of suspension for 9 hours at 105° C.

The characteristics of the decomposed liquor are identical to those of the liquor of Example III.

Digestion at 107° C. for 1 hour and 30 minutes in an atmospheric reactor by the remaining part of the concentrated decomposed liquor or digestion liquor identical to the one of Example III while aiming for an Rp value of 1.15.

Characteristics after decantation of the suspension resulting from the post-desilication:

| Rp: | 1.15 |
|---|---|
| $Na_2O$: | 168 g/l |
| $SiO_2/Na_2O$: | 0.65 |
| % Yield: | 98.1% |

Using a total desilication time of 13 hours, one obtains a good purification with respect to the reactive silica in the liquor while keeping an excellent yield, in spite of the high Rp.

EXAMPLE VI

This Example was designed to determine the highest value of Rp acceptable in the present method invention by combining a long 9-hour pre-desilication, with a standard 7-hour post-desilication with a previous very weak dilution to approximately 175 g $Na_2O$/liter in order to limit the retrogradation risks since the desired Rp is 1.17. This treatment was conducted on a 5-ton fraction of the Guinean bauxite lot previously characterized, and comprises:

Wet grinding and pre-desilication with an aliquot of decomposed liquor and 900 kg of dry material per m³ of suspension for 9 hours at 105° C.

The characteristics of the decomposed liquor are identical to those of the liquor of Example III.

Digestion at 107° C. for 2 hours and 30 minutes in an atmospheric reactor by the remaining part of the concentrated decomposed liquor or digestion liquor identical to the one of Example III while aiming for an Rp value of 1.17.

Post-desilication for 7 hours at 100° C. of the suspension resulting from the digestion after adjustment of the sodium hydroxide concentration to 175 g $Na_2O$/liter.

Characteristics after decantation of the suspension resulting from the post-desilication:

| Rp: | 1.13 |
|---|---|
| $Na_2O$: | 177 g/l |
| $SiO_2/Na_2O$: | 0.63 |
| % Yield: | 88.8% |

One observes a yield loss of almost 10% compared to the results of Examples III, IV and V which leads to an important decrease in the Rp value. This confirms the obligation to limit the application of the present process to Rp values not exceeding 1.15, even with a relatively high sodium hydroxide concentration before post-desilication.

EXAMPLE VII

This Example combines an average 5-hour pre-desilication, with a reduced 4-hour post-desilication with weak dilution to approximately 165 g $Na_2O$/liter while aiming for an Rp value of 1.12. This treatment was done on a 10-ton fraction of the Guinean bauxite lot previously characterized, and comprises:

Wet grinding and pre-desilication with an aliquot of decomposed liquor and 1100 kg of dry material per m³ of thick suspension for 5 hours at 100° C.

The characteristics of the decomposed liquor are identical to those of the liquor of Example III.

Digestion at 107° C. for 1 hour and 30 minutes in an atmospheric reactor by the remaining part of the concentrated decomposed liquor or digestion liquor identical to the one of Example III while aiming for an Rp value of 1.12.

Post-desilication for 4 hours at 105° C. of the suspension resulting from the digestion and after adjustment of the sodium hydroxide concentration to 170 g Na$_2$O/liter.

Characteristics after decantation of the suspension resulting from the post-desilication:

| | |
|---|---|
| Rp: | 1.12 |
| Na$_2$O: | 171 g/l |
| SiO$_2$/Na$_2$O: | 0.64 |
| % Yield: | 98.4% |

After diluting the decomposed liquor to approximately 150 g Na$_2$O/liter until Rp=0.57, one obtains a productivity of 82.5 kg Al$_2$O$_3$/m$^3$.

The choice of average time conditions for both the pre-desilication and the post-desilication demonstrates that one can achieve an excellent compromise between the silica purification, the extraction yield, and the productivity which is greater than 80 kg Al$_2$O$_3$/m$^3$ of liquor, using a total desilication time not exceeding 9 hours.

This application is based on French Application No. 95-04069 filed Mar. 31, 1995, incorporated herein by reference.

What is claimed as new and desired to be secured by Letters Patent of the United States is:

1. A method of preparing a supersaturated sodium aluminate liquor, comprising the steps of:
   (a) pre-digestion desilicating by heating a suspension of ground bauxite in an aqueous solution comprising sodium hydroxide at a temperature greater than 80° C.;
   (b) increasing the sodium hydroxide concentration of the suspension from step (a);
   (c) digesting said bauxite by heating the suspension from step (b) at a temperature greater than 80° C.;
   (d) diluting the suspension from step (c) with an aqueous solution; and
   (e) post-digestion desilicating by heating the suspension from step (d) at a temperature greater than 80° C., to afford a suspension comprising a supersaturated, desilicated sodium aluminate liquor and insoluble solid.

2. A method of producing alumina trihydrate according to claim 1, comprising the additional steps:
   (f) removing insoluble solid from said supersaturated, desilicated sodium aluminate suspension to afford a supersaturated, desilicated sodium aluminate liquor;
   (g) cooling and decomposing the supersaturated sodium aluminate liquor from step (f), affording a suspension of precipitated alumina trihydrate in decomposed sodium aluminate liquor;
   (h) isolating the precipitated alumina trihydrate from step (g);
   (i) recycling a fraction of the decomposed sodium aluminate liquor from step (g) to step (a);
   (j) recharging the remaining fraction of the decomposed sodium aluminate liquor from step (g) by evaporation and addition of sodium hydroxide to afford a digestion liquor; and
   (k) recycling the digestion liquor from step (j) to step (b).

3. The method of claim 1, wherein the aqueous solution in step (a) is a decomposed sodium aluminate liquor, wherein Rp is 0.5 to 0.7 and the concentration of sodium hydroxide is 140 to 170 g Na$_2$O/liter.

4. The method of claim 1, wherein the aqueous solution in step (a) is a decomposed sodium aluminate liquor, wherein Rp is 0.57 to 0.67 and the concentration of sodium hydroxide is 150 to 160 g Na$_2$O/liter.

5. The method of claim 1, wherein the weight content of reactive silica of said bauxite is less than 3% of the dry weight of said bauxite.

6. The method of claim 1, wherein the weight content of reactive silica of said bauxite is 0.5 to 1.5% of the dry weight of said bauxite.

7. The method of claim 1, wherein the suspension in step (a) has a concentration of dry material greater than or equal to 0.7 ton/m$^3$.

8. The method of claim 1, wherein the suspension in step (a) has a concentration of dry material of 0.9 to 1.1 ton/m$^3$.

9. The method of claim 1, wherein said method is conducted at atmospheric pressure.

10. The method of claim 1, wherein step (a) is conducted for a period of time greater than or equal to 30 minutes.

11. The method of claim 1, wherein steps (a), (c), and (e) are conducted at a temperature less than or equal to 108° C.

12. The method of claim 1, wherein step (a) is conducted at a temperature of 100° C. to 105° C. for 1 to 6 hours.

13. The method of claim 1, wherein step (b) is effected by the addition of a digestion liquor comprising soluble alumina and sodium hydroxide, wherein Rp is 0.5 to 0.7 and the sodium hydroxide concentration is 180 to 220 g Na$_2$O/liter.

14. The method of claim 1, wherein step (b) is accomplished by the addition of a digestion liquor comprising soluble alumina and sodium hydroxide, wherein Rp is 0.57 to 0.67 and the sodium hydroxide concentration is 195 to 215 Na$_2$O/liter.

15. The method of claim 1, wherein step (c) is conducted at a temperature of 103° C. to 107° C. for 1 to 3 hours.

16. The method of claim 1, wherein step (c) is conducted for a length of time sufficient to extract greater than or equal to 95% of the extractable alumina from the ground bauxite.

17. The method of claim 1, wherein the sodium aluminate enriched suspension from step (c) has an Rp value of 1.09 to 1.15 and a sodium hydroxide concentration of 175 to 190 g Na$_2$O/liter.

18. The method of claim 1, wherein the diluted suspension from step (d) has a sodium hydroxide concentration of 140 to 180 g Na$_2$O/liter and an Rp value of 1.05 to 1.17.

19. The method of claim 1, wherein the diluted suspension from step (d) has a sodium hydroxide concentration of 160 to 170 g Na$_2$O/liter.

20. The method of claim 1, wherein step (d) is effected with an aqueous wash of the remaining insoluble solid of a supersaturated sodium aluminate suspension.

21. The method of claim 1, wherein step (d) is effected with an aqueous wash of precipitated alumina trihydrate.

22. The method of claim 1, wherein step (e) is conducted for period of time sufficient to reduce the weight content of soluble SiO$_2$/Na$_2$O to less than 0.9%.

23. The method of claim 1, wherein step (e) is conducted at a temperature less than or equal to 108° C. for at least 2 hours.

24. The method of claim 1, wherein step (e) is conducted at a temperature between 100° C. to 105° C. for 4 to 8 hours.

25. The method of claim 1, wherein the suspension from (e) has a weight content of soluble SiO$_2$/Na$_2$O of less than 0.9%.

26. The method of claim 1, wherein the suspension from (e) has a weight content of soluble SiO$_2$/Na$_2$O of less than or equal to 0.7%.

27. The method of claim 2, wherein said method additionally comprises security filtering the supersaturated sodium aliminate liquor from step (f).

28. The method of claim 2, wherein step (g) is conducted in the presence of seed particles of alumina trihydrate.

29. The method of claim 2, wherein step (h) is accomplished by filtering said alumina trihydrate suspension and aqueous washing of the filtered alumina trihydrate.

30. The method of claim 2, wherein the decomposed sodium aluminate liquor from step (g) has a sodium hydroxide concentration of 140 to 180 g Na$_2$O/liter and an Rp value of 0.5 to 0.7.

31. The method of claim 2, wherein the alumina trihydrate from step (h) comprises less than 100 ppm of silica.

32. The method of claim 2, wherein the digestion liquor from step (j) has a sodium hydroxide concentration of 180 to 220 g Na$_2$O/liter and an Rp value of 0.5 to 0.7.

33. The method of claim 2, wherein the productivity of said supersaturated sodium aluminate liquor from step (f) satisfies the relationship:

$$P = C\Delta Rp > 70 \text{ kg } Al_2O_3/m^3$$

wherein P is the productivity of said supersaturated sodium aluminate liquor, C is the concentration of sodium hydroxide of said supersaturated sodium aluminate liquor, and $\Delta$Rp is the difference between the Rp values of said supersaturated sodium aluminate liquor before and after step (g).

* * * * *